Feb. 27, 1934.  M. N. DUNLAP  1,948,849
SAUCEPAN LID
Filed April 15, 1933
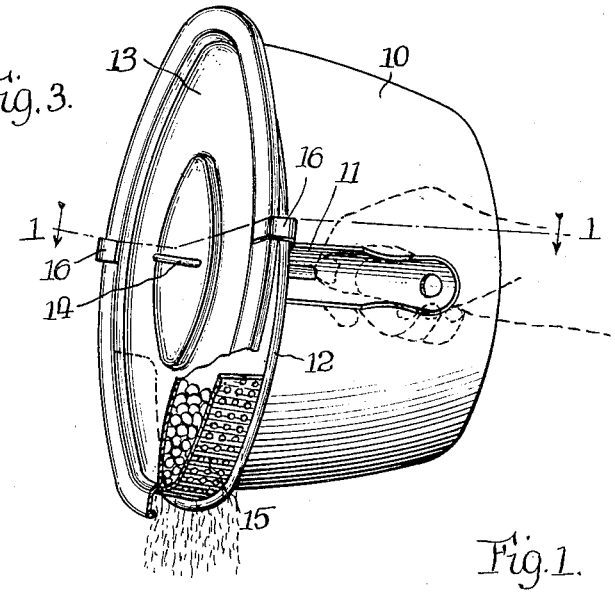
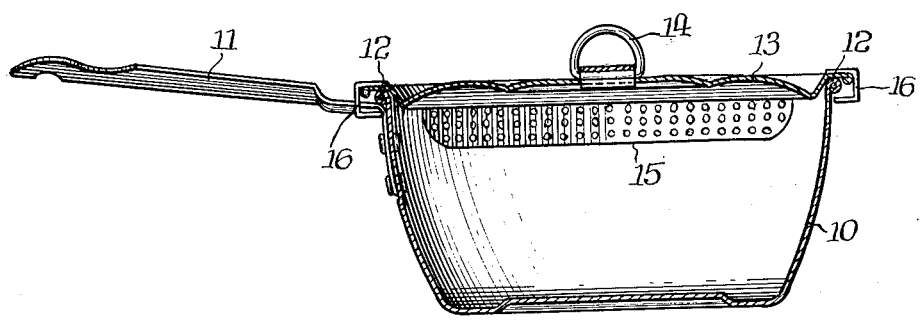
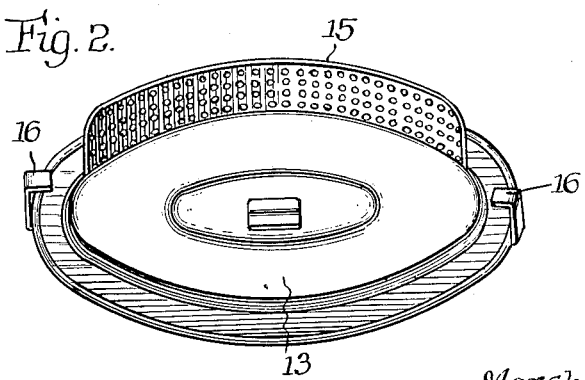
Inventor:
Marshall N. Dunlap,
By Fisher, Clapp, Soans + Pond, Attys.

Patented Feb. 27, 1934

1,948,849

UNITED STATES PATENT OFFICE 1,948,849

SAUCEPAN LID

Marshall N. Dunlap, Chicago, Ill., assignor of one-half to Arthur Molden, Sioux City, Iowa Application April 15, 1933. Serial No. 666,241

4 Claims. (Cl. 53—8)

This invention relates to the general art of cooking utensils, having reference more particularly to sauce pans such as are used mainly for boiling vegetables. The ordinary sauce pan is equipped with a handle and with a lid consisting simply of a metal disc of a size to seat on the top edge of the pan and usually supplied with a central handle in the form of a ring or knob. The housewife or cook, when pouring off the cooking water, tilts the pan with one hand to pouring position and, with the other hand, holds the lid against sliding off, at the same time slightly swinging the lower edge of the lid away from the opposed edge of the pan to form a narrow gap or crack through which the water and steam can escape. This is not only a two-hand operation, but the hand holding the lid is liable to be scalded by the escaping steam unless care is exercised to prevent it. Moreover, when cooking small vegetables like peas and beans, if the lid is swung too far away from the edge of the pan, part of the solid contents escape with the water and steam, thus causing waste.

The object of the present invention is to provide an improved sauce pan lid that will enable the pouring operation to be performed with one hand only, thus eliminating the danger of scalding the other hand; that will be automatically retained on the pan during the pouring operation; that will automatically tilt away from the lower edge portion of the pan when the latter is tilted to pouring position to provide a crack or gap for the outflow of water and steam; that will securely hold back the solid matter in the pan during the pouring operation; and that may be applied to and removed from the pan with substantially the same ease as the ordinary plain disc lid.

Still other objects and attendant advantages of the invention will be apparent to persons familiar with this class of cooking utensils and their mode of use from the following detailed description, taken in connection with the accompanying drawing wherein I have illustrated one simple and practical embodiment of the invention, and in which—

Fig. 1 is a vertical section through the pan and lid, on the line 1—1 of Fig. 3, but showing the lid in fully closed position.

Fig. 2 is a perspective view of the lid in inverted position.

Fig. 3 is a perspective view of the pan and lid in tilted pouring position.

Referring to the drawing, 10 designates the body and 11 the handle of an ordinary sheet metal sauce pan. The body 10 is usually formed with a rolled external bead 12 on its top edge.

13 designates the lid in the usual pressed metal disc form, adapted to seat on the top edge of the pan and equipped with a central handle 14.

In carrying out my invention I solder or otherwise permanently secure to the under side of the lid 13 a depending arcuate screen 15, preferably consisting of a curved strip of sheet metal formed with numerous fine perforations of a size to freely pass water and steam, but hold back small or finely comminuted vegetables. This screen 15 is also preferably made of substantial depth, so that, when the lower portion of the lid is tilted away from the opposed edge of the pan an ample distance to allow the free escape of water and steam, as shown in Fig. 3, it will still span the pour gap between the lid and pan and thus hold back the solid matter being cooked.

To make the pouring a one-hand operation, I equip the lid with means, cooperating with the pan, for preventing the lid from falling or sliding off the pan when the latter is tilted to pouring position. This means preferably takes the form of a pair of depending hooks 16 that are soldered or otherwise secured to the edge of the lid at approximately diametrically opposite points of the latter, with their free ends spaced apart a distance slightly less than the diameter of the upper end of the pan body. When the cover is in place on the pan the free ends of the hooks underlie the bead 12 with a small clearance, as best shown in Fig. 1. With this construction the lid can be applied to the pan by simply sliding it edgewise over the top of the pan, with the screen 15 foremost, until the screen abuts against the wall of the pan, as shown in Fig. 1, at which time one of the hooks 16 comes into edge contact with the handle 11. Now, when the pan is tilted for the pouring operation, as shown in Fig. 3, the weight of the solid matter in the pan pushes the lower portion of the lid outwardly until the free ends of the hooks 16 abut against the bead 12. This limits the tilting movement of the lid on the pan, and at the same time the hooks 16 prevent the lid from falling away from the pan and both the screen 15 and the hooks 16 prevent the lid from sliding off the pan. When the pan is returned to upright position, the lid automatically reseats itself. A mere backward sliding and lifting movement removes the lid from the pan.

The foregoing description, in connection with the drawing, will, it is believed, make clear the novel structural features of the invention, and the manner in which the stated objects and advantages are secured. The improvement adds but a trifle to the cost of manufacture, and renders the utensil much simpler and safer to manipulate. And, while I have shown and described one simple and practical form in which the improvement may be physically expressed, changes in the structural details may be resorted to within the scope and purview of the claims. And while I have described the invention as an improvement in lids for sauce pans, it is manifest that its use may be extended to lids for frying pans and other utensils of the same general nature and use as sauce pans.

I claim:

1. A removable sauce pan lid having on its under side a depending screen adapted to span a portion of the joint between the lid and the top edge of the pan, and hooks on said lid adapted to engage with a bead on the top edge of the pan to lock the lid against falling off the pan when the latter is tilted to pouring position.

2. A removable sauce pan lid having on its under side a depending screen adapted to span a portion of the joint between the lid and the top edge of the pan, and a pair of hooks on the edge of said lid adapted to engage with a bead on the top edge of the pan, the free ends of said hooks being spaced apart a distance slightly less than the outside diameter of the top of the pan body, whereby to lock the lid against sliding off the pan when the latter is tilted to pouring position.

3. A removable sauce pan lid having on its under side a depending screen adapted to span a portion of the joint between the lid and the top edge of the pan, and a pair of opposed hooks on the edge of said lid adapted to engage with a bead on the top edge of the pan, said hooks being deeper than the bead of the pan, thereby permitting a tilting of the lid on the pan when the latter is tilted to pouring position.

4. A removable sauce pan lid having on its under side a depending screen adapted to span a portion of the joint between the lid and the top edge of the pan, and means carried by said lid serving, through engagement with the outer side of the pan and independently of the screen to hold the lid against sliding off the pan when the latter is tilted to pouring position.

MARSHALL N. DUNLAP.